(12) United States Patent
Arulesan et al.

(10) Patent No.: US 10,044,576 B2
(45) Date of Patent: Aug. 7, 2018

(54) ESTIMATION OF POWER CONSUMPTION OF INDIVIDUAL WEBSITES

(71) Applicant: QUALCOMM Incorporated, San Diego, CA (US)

(72) Inventors: Veluppillai Arulesan, Toronto (CA); Shiu Wai Hui, Richmond Hill (CA); Stewart Chao, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 14/952,654

(22) Filed: Nov. 25, 2015

(65) Prior Publication Data

US 2017/0149633 A1 May 25, 2017

(51) Int. Cl.
| | |
|---|---|
| *H04W 52/02* | (2009.01) |
| *H04L 12/26* | (2006.01) |
| *H04L 29/08* | (2006.01) |
| *H04W 72/04* | (2009.01) |
| *G06F 17/30* | (2006.01) |
| *G06F 11/30* | (2006.01) |
| *G06F 11/34* | (2006.01) |

(52) U.S. Cl.
CPC .......... *H04L 43/04* (2013.01); *G06F 11/3062* (2013.01); *G06F 11/348* (2013.01); *G06F 11/3409* (2013.01); *G06F 17/30861* (2013.01); *H04L 67/02* (2013.01); *H04W 52/0254* (2013.01); *H04W 72/0473* (2013.01); *Y02D 10/45* (2018.01); *Y02D 70/00* (2018.01); *Y02D 70/142* (2018.01)

(58) Field of Classification Search
CPC ............ G06F 11/3062; G06F 11/3409; G06F 11/348; G06F 17/30861; H04L 43/04; H04L 67/02; H04W 52/0254; H04W 72/0473
See application file for complete search history.

(56) References Cited

U.S. PATENT DOCUMENTS

| | | | |
|---|---|---|---|
| 7,967,212 B1 | 6/2011 | Euler et al. | |
| 8,032,317 B2 | 10/2011 | Houston et al. | |
| 8,971,819 B2 | 3/2015 | Nicoara et al. | |
| 2005/0076253 A1* | 4/2005 | Lu | G06F 1/3203 713/320 |
| 2011/0072378 A1* | 3/2011 | Nurminen | G06F 1/32 715/771 |
| 2011/0096077 A1* | 4/2011 | Jarrett | G06F 9/5094 345/473 |
| 2012/0200587 A1 | 8/2012 | Bapst et al. | |
| 2012/0322387 A1* | 12/2012 | Nicoara | H04M 1/24 455/67.11 |
| 2014/0365794 A1 | 12/2014 | Decker et al. | |
| 2015/0227445 A1 | 8/2015 | Arscott et al. | |

(Continued)

OTHER PUBLICATIONS

International Search Report and Written Opinion—PCT/US2016/057518—ISA/EPO—dated Jan. 17, 2017.

*Primary Examiner* — Awet Haile
(74) *Attorney, Agent, or Firm* — Haynes and Boone, LLP (57) ABSTRACT

An example method of estimating a power consumption of one or more websites includes receiving browser metrics from a browser hosted on a device. The browser metrics correspond with accessing a single website. The method also includes estimating a power consumption by the device while accessing the single website based on the browser metrics.

20 Claims, 6 Drawing Sheets

(56) References Cited

U.S. PATENT DOCUMENTS

2015/0309910 A1* 10/2015 Cook ................. G06F 11/3409
709/224
2015/0362976 A1* 12/2015 Caliendo, Jr. ......... G06F 1/3218
713/320
2016/0260228 A1* 9/2016 Chen ........................ G06T 9/00

* cited by examiner

ESTIMATION OF POWER CONSUMPTION OF INDIVIDUAL WEBSITES

FIELD OF DISCLOSURE

The present disclosure generally relates to computing devices, and more particularly to estimating the power consumption of individual websites.

BACKGROUND

Mobile devices are ubiquitous and may include a smartphone, tablet computer, portable digital assistant (PDA), portable game console, palmtop computer, and other portable electronic devices. In addition to the primary function of these devices, many include peripheral functions. Applications may be installed on the mobile device to provide these peripheral functions. In an example, an application is provided by a third party, and a user may download the application onto the mobile device. In another example, the user receives the mobile device with the application already installed on the mobile device. One of the most common use cases after telephony on modern mobile devices is Web browsing. A mobile device may include the primary function of making telephone calls and the peripheral functions of Web browsing, which may be data heavy and time-consuming. As websites become more dynamic and heavy, the processing power required by the device to support such Web browsing functionality also increases.

Battery life is a key metric for mobile device users. If a user's smartphone is running low on battery power, the user may not want to start power hungry applications or games. In low-battery situations, conventional techniques may provide the user with information on which applications or games on the device are power hungry by using heuristics and information provided by the operating system. The power consumption rate for applications or games on the mobile device may be consistent and not dependent on different factors. It may be difficult, however, to estimate a power consumption rate for browsers that are dependent on various factors.

BRIEF SUMMARY

The power consumption rate for a browser hosted on a mobile device is highly dependent on the website being requested by the user of the mobile device. For example, websites contain different content, and some websites may be heavy in content and data processing while others are not. It may be desirable to identify those websites that are responsible for high power drain. Methods, systems, and techniques for estimating a power consumption of one or more websites are provided.

According to an embodiment, a method of estimating a power consumption of one or more websites includes receiving browser metrics from a browser hosted on a device. The browser metrics correspond with accessing a single website. The method also includes estimating a power consumption by the device while accessing the single website based on the browser metrics.

A system for estimating a power consumption of one or more websites includes a browser metrics module that receives browser metrics from a browser hosted on a device. The browser metrics correspond with accessing a single website. The system also includes a power consumption estimator that estimates a power consumption by the device while accessing the single website based on the browser metrics.

According to another embodiment, a computer-readable medium has stored thereon computer-executable instructions for performing operations including: receiving browser metrics from a browser hosted on a device, the browser metrics corresponding with accessing a single website; and estimating a power consumption by the device while accessing the single website based on the browser metrics.

According to another embodiment, an apparatus for estimating a power consumption of one or more websites includes means for receiving browser metrics from a browser hosted on a device, the browser metrics corresponding with accessing a single website; and means for estimating a power consumption by the device while accessing the single website based on the browser metrics.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Estimate a Power Consumption of a Single Website Based on Metrics
  A. Hardware Metrics
  B. Browser Metrics
  C. Provide User with a Warning
IV. Lifecycles of a Webpage
V. Example Method
VI. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

One of the key metrics mobile device users care about is battery life. More and more users are using their mobile devices for Web browsing. Although Web browsing may consume a lot of battery power, the amount of power consumed varies depending on the particular websites being accessed. It may be desirable to estimate a power consumption of individual websites accessed by the mobile device and identify those that are power hungry. If the user attempts to access a power hungry website while the battery is low, the mobile device may display a warning to the user. The warning may inform the user that loading the requested webpage may be a fairly big drain on the battery, which is already low. The user may still express a desire to navigate to that website, but will do so knowing that the website is power hungry and the battery is low. Alternatively, the user may decide to skip loading the requested webpage and may navigate to another website to conserve battery. Either way, the user is provided with information to make an informed decision about which applications to run or not to run depending upon their understanding of an application's battery drain.

The present disclosure provides techniques to collect and estimate power consumption on a per website basis to understand the power impact of individual websites. A mobile device may access a first website and a second website. An estimated power consumption of a first website may be determined independent from an estimated power consumption of a second website. In an embodiment, a system for estimating a power consumption of one or more website includes a browser metrics module that receives browser metrics from a browser hosted on a device. The browser metrics correspond with accessing a single website. The system also includes a power consumption estimator that estimates a power consumption by the device while accessing the single website based on the browser metrics.

II. Example System Architecture

Figure 1:
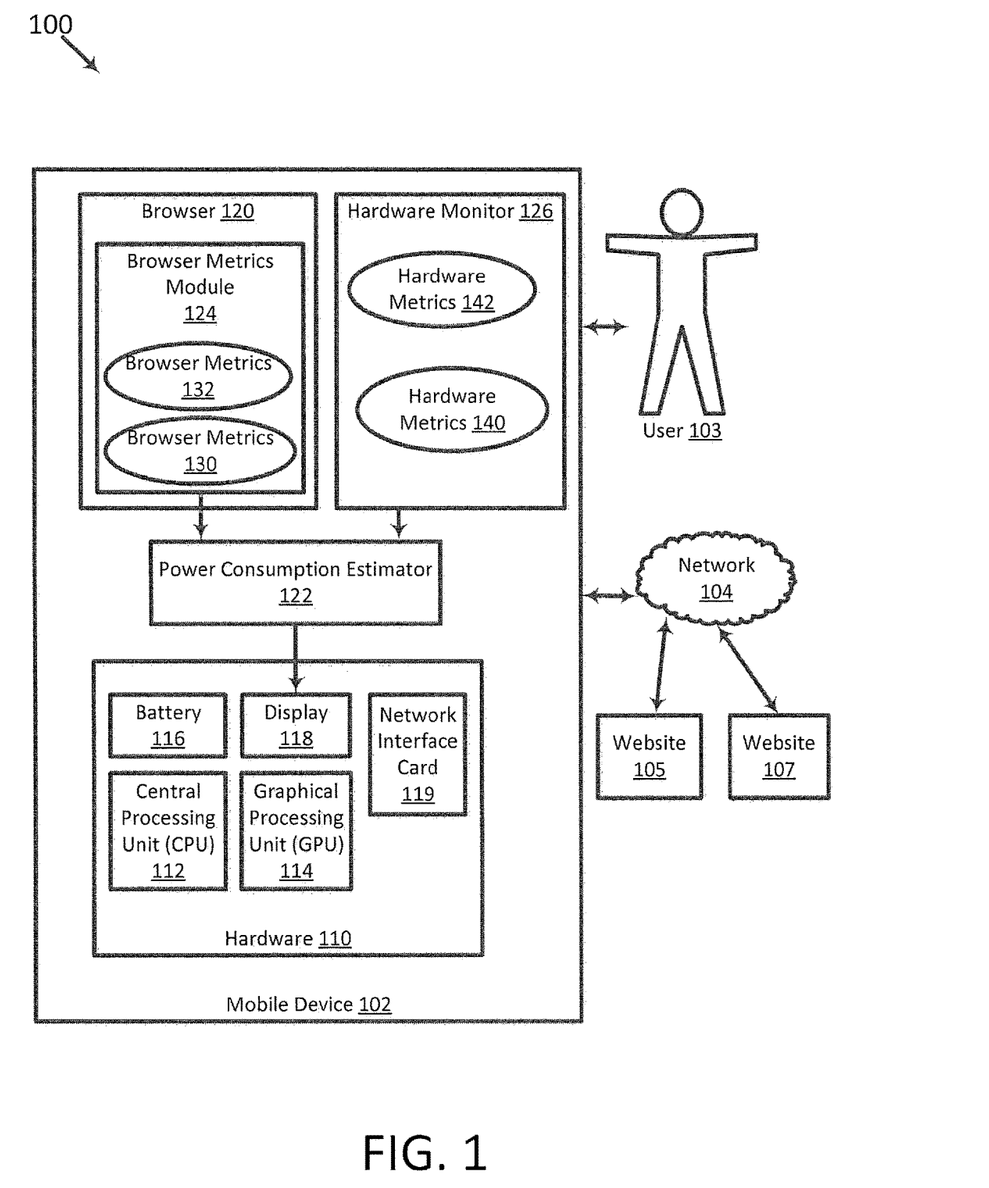
FIG. 1 is a block diagram illustrating a mobile device that may be used to implement the power consumption estimation techniques of this disclosure in accordance with one or more embodiments.

FIG. 1 is a block diagram 100 illustrating a mobile device 102 that may be used to implement the power consumption estimation techniques of this disclosure in accordance with one or more embodiments. Mobile device 102 is coupled to a network 104. Network 104 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Mobile device 102 may be, for example, a laptop computer, a wireless communication device (e.g., a mobile telephone, a cellular telephone, a satellite telephone, and/or a mobile telephone handset), a handheld device such as a portable video game device or a personal digital assistant (PDA), a personal music player, a video player, or any other type of mobile device that is capable of accessing data from a network.

Mobile device 102 includes hardware 110, which includes one or more central processing units (CPUs) 112, one or more graphics processing units (GPUs) 114, a battery 116, a display 118, and network interface card 119. Hardware 110 may also include other devices. A "CPU" may also be referred to as a "hardware processor," "physical processor," or "processor" herein. A CPU shall refer to a device capable of executing instructions encoding arithmetic, logical, or input/output (I/O) operations. In one illustrative example, a CPU may follow the Von Neumann architectural model and may include an arithmetic logic unit (ALU), a control unit, and a plurality of registers. CPU 112 may include a general-purpose or a special-purpose processor that controls operation of mobile device 102. A user may provide input to mobile device 102 to cause CPU 112 to execute one or more software applications. The software applications that execute on CPU 112 may include, for example, an operating system, a software application (e.g., a browser, a word processor application, an email application, a spread sheet application, a video game application, a graphical user interface (GUI) application, or another program). The user may provide input to mobile device 102 via one or more input devices (not shown) such as a keyboard, a mouse, a microphone, a touch pad or another input device that is coupled to mobile device 102 via a user interface.

In a further aspect, a CPU may be a single core CPU that is typically capable of executing one instruction at a time (or process a single pipeline of instructions), or a multi-core CPU that may simultaneously execute multiple instructions. In another aspect, a CPU may be implemented as a single integrated circuit, two or more integrated circuits, or may be a component of a multi-chip module (e.g., in which individual microprocessor dies are included in a single integrated circuit package and hence share a single socket).

Mobile device 102 may be equipped with one or more high-performance GPUs 114 providing high performance with regard to computations and graphics rendering. To process the graphics rendering instructions, CPU 112 may issue one or more graphics rendering commands to GPU 114 to cause GPU 114 to perform some or all of the rendering of the graphics data. GPU 114 may, in some instances, be built with a highly-parallel structure that provides more efficient processing of vector operations than CPU 112. Mobile device 102 may use GPU 114 to accelerate the rendering of graphics data for display. Mobile device 102 may include a client application (e.g., a browser 120) that executes on CPU 112 and/or GPU 114.

GPU 114 may, in some instances, be integrated into a motherboard of mobile device 102. In other instances, GPU 114 may be present on a graphics card that is installed in a port in the motherboard of mobile device 102 or may be otherwise incorporated within a peripheral device configured to interoperate with mobile device 102. In further instances, GPU 114 may be located on the same microchip as CPU 112 forming a system on a chip (SoC). GPU 114 may include one or more processors, such as one or more microprocessors, application specific integrated circuits (ASICs), field programmable gate arrays (FPGAs), digital signal processors (DSPs), or other integrated or discrete logic circuitry.

Display 118 may be integrated within mobile device 102. For example, display 118 may be a screen of mobile device 102. Alternatively, display 118 may be a stand-alone device coupled to mobile device 102 via a wired or wireless communications link. For example, display 118 may be a computer monitor or flat panel display coupled to mobile device 102 via a cable or wireless link.

In FIG. 1, a user 103 may use browser 120 to access data over network 104 from a website 105 or website 107. Network interface card 119 may receive data from and send data to websites 105 and 107 over network 104. A website is a set of related webpages typically served from a single Web domain. Browser 120 may be hosted on mobile device 102 and used for retrieving, presenting, and traversing information resources provided by servers (e.g., web servers on the World Wide Web). An information resource is identified by a uniform resource identifier (URI) and may be a webpage, image, video, client-side scripts, and/or other piece of content.

Battery 116 powers mobile device 102. The use of browser 120 may have an effect on battery 116's battery life. Battery life is the amount of time mobile device 102 runs before the battery needs to be recharged. It may be desirable to maximize the battery life of battery 116. Battery 116 may be, for example, a lithium-ion battery. If user 103 desires to start a power hungry application or game on mobile device 102 and the power level of battery 116 is below a threshold level, it may be desirable to warn user 103 that the battery level is low and the selected application or game is a power hungry application or game. A power hungry application or game may refer to an application or game that is estimated to consume at least a threshold amount of power corresponding with accessing the application or game. The amount of power consumed corresponding with accessing an application or game may depend on mobile device 102 and the capacity of battery 116. In an example, an application that consumes more than 5% of battery capacity within a particular timeframe (e.g., 10 minutes) may be identified as a power hungry application.

In some examples, a website may be identified as a power hungry application. The warning to user 103 may be displayed on display 118 along with a first user selectable option that if selected indicates that the user wishes to proceed with mobile device 102 starting the application or game despite mobile device 102 being low on battery and/or a second user selectable option that if selected indicates that the user does not wish to proceed with mobile device 102 starting the application or game.

Mobile device 102 includes a power consumption estimator 122, a browser metrics module 124, and a hardware monitor 126. Power consumption estimator 122 collects and estimates the power consumption of one or more websites on battery 116. Some websites may be heavy, while others may be light on power consumption. In some embodiments, power consumption estimator 122 collects and estimates the power consumption on a per-website basis to understand the power impact of individual websites on battery 116. Although in FIG. 1, browser metrics module 124 is illustrated as being incorporated in browser 120, this is not intended to be limiting and browser metrics module 124 may be separate from browser 120 (see FIG. 3).

For one or more websites, browser metrics module 124 and/or hardware monitor 126 may collect information corresponding with accessing each of the respective websites and provide the information to power consumption estimator 122. Browser 120 includes a browser metrics module 124 that collects metrics and builds heuristics into browser 120 by tracking features of website accesses. Browser metrics module 124 may collect the browser metrics on a per-website basis. In an example, browser metrics 130 correspond to website 105, and browser metrics 132 correspond to website 107. Hardware monitor 126 collects metrics and builds heuristics by monitoring one or more hardware units corresponding to website accesses. Hardware monitor 126 may collect the hardware metrics on a per-website basis. In an example, hardware metrics 140 correspond to website 105, and hardware metrics 142 correspond to website 107.

III. Estimate a Power Consumption of a Single Website Based on Metrics

Power consumption estimator 122 may analyze the information collected by browser metrics module 124 and/or hardware monitor 126 to estimate the power consumption of individual websites. It may be desirable to determine which websites are power hungry in order to warn a user attempting to access the website that it consumes a lot of power compared to other websites. The warning may be given to user 103 if, for example, mobile device 102 is running low on battery power.

A. Hardware Metrics

Figure 2:
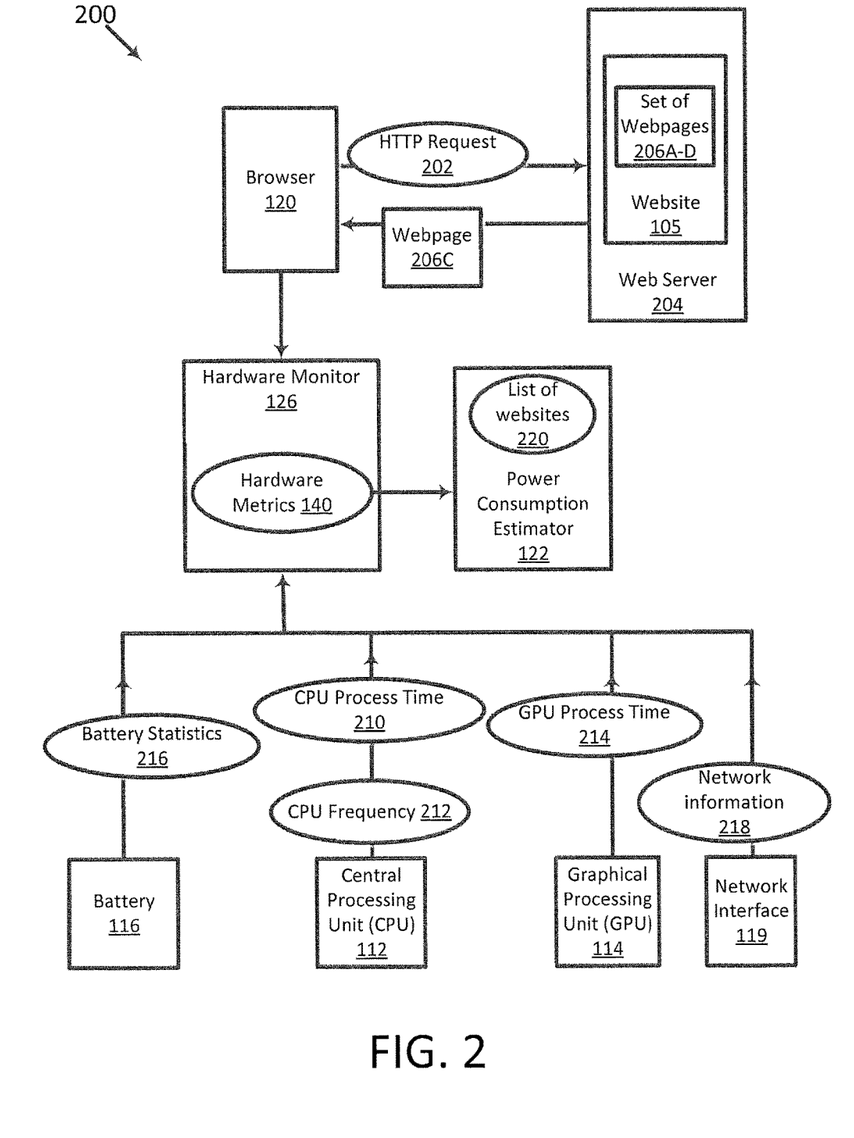
FIG. 2 is a block diagram illustrating a power consumption estimator receiving hardware metrics from a hardware monitor in accordance with one or more embodiments.

In some examples, power consumption estimator 122 receives hardware metrics from hardware monitor 126. FIG. 2 is a block diagram 200 illustrating power consumption estimator 122 receiving hardware metrics 140 from hardware monitor 126 in accordance with one or more embodiments. In FIG. 2, browser 120 sends an HTTP request 202 to a web server 204 for information resources stored at web server 204. Web server 204 hosts website 105, which contains a set of webpages 206A-D. HTTP request 202 may be a request for a webpage associated with website 105. In response to HTTP request 202, web server 204 may return a webpage 206C to browser 120. A webpage may contain content such as text, images, links, animation, video, JavaScript code to be executed at the client, etc.

Hardware monitor 126 may be informed that browser 120 has requested and/or received a webpage associated with website 105 and is attempting to load the webpage. Hardware monitor 126 monitors one or more hardware units in hardware 110 (e.g., CPU 112, GPU 114, battery 116, and/or network interface card 119) and maintains hardware metrics associated with one or more websites accessed by mobile device 102. Hardware metrics may correspond with the accessing of a single website by mobile device 102. For example, hardware monitor 126 may maintain hardware metrics 140 specific to website 105 and maintain hardware metrics 142 specific to website 107 (see FIG. 1). Accordingly, hardware metrics 140 correspond to website 105, and hardware metrics 142 correspond to website 107. In this example, hardware monitor 126 updates hardware metrics 140 in accordance with the impact on one or more hardware units corresponding with mobile device 102's accessing of website 105, and updates hardware metrics 142 in accordance with the impact on one or more hardware units corresponding with mobile device 102's accessing of website 107.

Hardware monitor 126 may track hardware metrics per website and provide these hardware metrics to power consumption estimator 122, which analyzes the hardware metrics to estimate a power consumption of individual websites. Hardware monitor 126 may be hardware (e.g., hardware sensor) or software running on CPU 112. Hardware metrics may include various metrics of one or more hardware units in or coupled to mobile device 102 in the context of accessing a particular website and may be maintained on a per-website basis. A website containing a set of webpages may be accessed by loading one or more webpages of the set of webpages.

It may be desirable to maintain hardware metrics that serve as proxies for power consumption and battery statistics data. In some examples, the hardware metrics may include CPU process time 210 of one or more CPUs and/or CPU frequency 212 of one or more CPUs. The process time of a CPU is the amount of time for which the CPU was used for processing instructions of a computer program or operating system. The CPU time may be measured in, for example, clock ticks or seconds. If the usage of CPU 112 is above a CPU usage threshold (e.g., 75% CPU usage at the maximum frequency) corresponding with accessing a single website (e.g., loading webpage(s) contained in website 105), this may indicate that the website is highly demanding of processing power, and thus is a power hungry website. In contrast, if the usage of CPU 112 is not above (e.g., equal to or below) the CPU usage threshold corresponding with accessing the single website, this may indicate that the website is not a power hungry website. CPU frequency may refer to the rate at which the system clock is toggling. If the CPU frequency of CPU 112 is above a CPU frequency threshold (e.g., the maximum CPU frequency) corresponding with accessing a single website, this may indicate that the website is highly demanding of processing power, and thus is a power hungry website. In contrast, if the CPU frequency of CPU 112 is not above the CPU frequency threshold corresponding with accessing the single website, this may indicate that the website is not a power hungry website.

In some examples, the hardware metrics may include GPU process time 214 of one or more GPUs. The process time of a GPU is the amount of time for which the GPU was used for processing instructions of a computer program or operating system. If the usage of GPU 114 is above a GPU usage threshold (e.g., greater than 75% usage of GPU at its maximum frequency) corresponding with accessing a single website, this may indicate that the website is highly demanding of processing power, and thus is a power hungry website. In contrast, if the usage of GPU 114 is not above the GPU usage threshold corresponding with accessing the single website, this may indicate that the website is not a power hungry website.

In some examples, the hardware metrics may include battery statistics 216. Battery 116 may provide battery statistics 216 (e.g., power level of battery 116, estimated battery life left, etc.) to hardware monitor 126. In an example, battery 116 provides its battery level at time T1 and time T2 to hardware monitor 126, where times T1 and T2 correspond to the loading of webpage 206C. Time T1 may correspond to the time at which loading of webpage 206D is initiated and time T2 may be at a later point in time than time T1. Time T2 may be, for example, a time period marked by a predetermined time interval (e.g., every 5 minutes), the time at which webpage 206C is finished loading, or the time at which user 103 closes out of website 105.

In some examples, the hardware metrics may include network information 218, which may include system bandwidth. Energy management is a critical issue for mobile devices, with network activity often consuming a significant portion of the total system energy. In some examples, network information 218 includes an amount of data (e.g., bytes) downloaded from web server 204 in order to load webpage 206C. If the amount of data downloaded corresponding with accessing a single website is above a threshold amount of downloaded data, this may indicate that the website is highly demanding of processing power, and thus is a power hungry website. In contrast, if the amount of data downloaded corresponding with accessing the single website is not above the threshold amount of downloaded data, this may indicate that the website is not a power hungry website. It should be understood that these are examples of hardware metrics, and other hardware metrics are within the scope of the present disclosure.

In FIG. 2, hardware metrics 140 may correspond to the loading of webpages 206A and 206B, and may be further updated based on the loading of webpage 206C. Hardware monitor 126 updates hardware metrics 140, which corresponds to the loading of webpages 206A and 206B contained in website 105, in accordance with the received information from battery 116, CPU 112, GPU 114, and/or network interface card 119. Hardware monitor 126 provides the updated hardware metrics to power consumption estimator 122, which processes the updated hardware metrics and estimates a power consumption by mobile device 102 while accessing the single website 105 based on hardware metrics 140.

Power consumption estimator 122 may maintain a list of websites 220 including a list of power hungry applications or services. Power consumption estimator 122 may determine whether website 105 is a power hungry application based on hardware metrics 140. In response to a determination that an estimated power consumption of website 105 is above a power threshold (e.g., 5% of battery capacity within a particular timeframe (e.g., 10 minutes)), power consumption estimator 122 may determine that website 105 is a power hungry application and accordingly add website 105 to list of websites 220.

In contrast, in response to a determination that the estimated power consumption of website 105 is not above the power threshold, power consumption estimator 122 may determine that website 105 is not a power hungry application and accordingly not add website 105 to list of websites 220. Hardware monitor 126 may continually update the hardware metrics corresponding to a particular website. Hardware metrics 140 may change in accordance with different webpages requested and loaded by mobile device 102 and associated with website 105. For example, webpages 206A and 206B may be loaded and contain a small amount of content, and webpage 206C may contain a large amount of animation and video, which increases the CPU process time. In this example, based on the loading of webpages 206A and 206B, power consumption estimator 122 may identify website 105 as not being a power hungry application. After power consumption estimator 122 receives the updated hardware metrics including the data corresponding to the loading of webpage 206C, however, power consumption estimator 122 may identify website 105 as being a power hungry application and add website 105 to list of websites 220. Additionally, if website 105 has already been added to list of websites 220 and power consumption estimator 122 determines that website 105 is no longer a power hungry application, power consumption estimator 122 may remove website 105 from list of websites 220.

Although hardware monitor 126 is illustrated as maintaining and updating hardware metrics 140, which corresponds to one single website, it should be understood that hardware monitor 126 may perform these actions to maintain and update hardware metrics corresponding to website 107 and/or any other websites.

B. Browser Metrics

Figure 3:
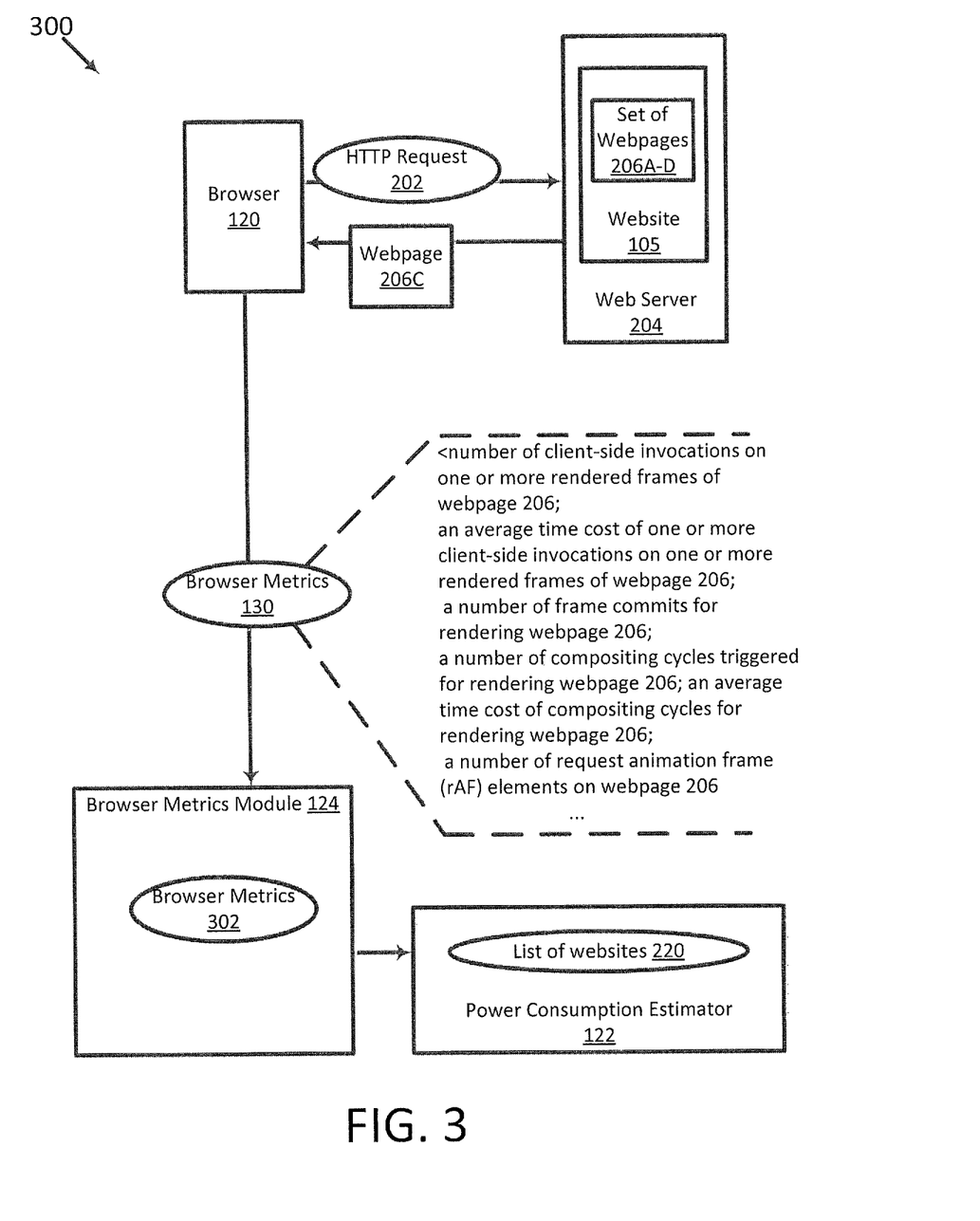
FIG. 3 is a block diagram illustrating the power consumption estimator receiving browser metrics from a browser metrics module in accordance with one or more embodiments.

In some examples, power consumption estimator 122 receives browser metrics from browser metrics module 124. FIG. 3 is a block diagram 300 illustrating power consumption estimator 122 receiving browser metrics 130 from browser metrics module 124 in accordance with one or more embodiments. Browser metrics module 124 monitors and tracks one or more features associated with loading one or more webpages contained in one or more websites. In FIG.

3, browser 120 and browser metrics module 124 are illustrated as being separate components or modules. In this example, browser 120 may parse a webpage and send browser metrics 130, which corresponds to the loading of the webpage, to browser metrics module 124. It should be understood that browser 120 and browser metrics module 124 may be used interchangeably in relation to monitoring, tracking, and updating browser metrics.

Browser metrics module 124 may track browser metrics per website and provide these browser metrics to power consumption estimator 122, which analyzes the browser metrics to estimate a power consumption of individual websites. Browser metrics may include various metrics of one or more features in the context of mobile device 102 accessing a particular website (e.g., loading webpages 206A, 206B, 206C, and/or 206D), and may be maintained on a per-website basis. Browser metrics may correspond with the accessing of a single website by mobile device 102.

It may be desirable to maintain browser metrics that serve as proxies for power consumption and battery statistics data. A website may contain a large amount of dynamic content generated by executing client-side scripts (e.g., JavaScript code). For example, some websites may have all of their user interface (UI) elements generated by JavaScript. Website 105 may include JavaScript, in which case browser 120 may download and execute the JavaScript code included in or referenced by webpage 206A, 206B, 206C, and/or 206D in order to generate dynamic content at the client. Browser metrics module 124 may track the number of client-side invocations (e.g., JavaScript calls) coming out of website 105. The more client-side scripts (e.g., JavaScript code) a webpage contains the more dynamic it is. Additionally, the more client-side scripts a webpage contains the higher the CPU utilization may be. If browser 120 invokes a client-side script contained in or referenced by webpage 206C, browser 120 will likely request a refresh of the webpage to display the result of that computation. The process of generating the dynamic content consumes time and power.

If a number of client-side invocations corresponding with accessing website 105 at mobile device 102 is above a threshold number of client-side invocations, this may indicate that the website is highly demanding of processing power, and thus is a power hungry website. In contrast, if the number of client-side invocations is not above the threshold number of client-side invocations, this may indicate that the website is not a power hungry website.

In some examples, the browser metrics include a number of client-side invocations on one or more rendered frames based on rendering one or more webpages of set of webpages 206A-D. The number of client-side invocations may correspond with the accessing of website 105 (e.g., loading of webpages 206A, 206B, 206C, and/or 206D) at mobile device 102. The client-side invocations may be JavaScript invocations, and the number of JavaScript invocations may be the number of JavaScript code snippets that are invoked as a result of loading one or more webpages of set of webpages 206A-D.

In some examples, the browser metrics include an average time cost of one or more client-side invocations on one or more rendered frames based on rendering one or more webpages of set of webpages 206A-D. The average time cost of the one or more client-side invocations on the one or more rendered frames may correspond with the accessing of website 105 (e.g., loading of webpages 206A, 206B, 206C, and/or 206D) at mobile device 102. Browser metrics module 124 may track the amount of time it takes CPU 112 to complete client-side invocations. A client-side invocation may be a JavaScript invocation, and the average time cost of a set of JavaScript invocations contained in or referenced by the loaded webpage(s) contained in the website may be the average amount of time consumed for processing the set of JavaScript invocations as a result of loading the webpage(s). Some client-side invocations may be heavy, and some may be light. Accordingly, the amount of processing time and computation for completing one client-side invocation may be different from the amount of processing time and computation for completing another client-side invocation. The power impact of a heavy JavaScript call may be greater than the power impact of a lighter JavaScript call on battery 116. If an average time cost of the one or more client-side invocations on the one or more rendered frames corresponding with accessing website 105 is above an average-time-cost invocation threshold, this may indicate that website 105 is highly demanding of processing power, and thus is a power hungry website. In an example, if the average time cost of client invocations is greater than twice the frame cost (e.g., 33 milliseconds), website 105 may be identified as a power hungry website. In contrast, if the average time cost of the one or more client-side invocations on the one or more rendered frames is not above the average-time-cost invocation threshold, this may indicate that the website is not a power hungry website.

In some examples, the browser metrics include a number of main frame commits based on rendering one or more webpages of set of webpages 206A-D. The number of main frame commits may correspond with the accessing of website 105 (e.g., loading of webpages 206A, 206B, 206C, and/or 206D) at mobile device 102. Browser 120 may have a main thread that handles the layout of webpages (e.g., placement of elements contained in or referenced by a webpage) and a rendering thread that receives a workload from the main thread to process and render to display 118. The rendering thread may also be referred to as the compositing thread. The layout portion of rendering a webpage may be referred to as a main frame commit. In response to a determination that a threshold number of elements contained in or referenced by a webpage have been downloaded and have changed since the last commit, browser 120 may commit the content to the rendering thread for display on display 118. The content that is shown to user 103 may or may not be the final webpage, and may be referred to as an intermediate frame if the content displayed is not the final webpage. If a number of main frame commits corresponding with accessing website 105 at mobile device 102 is above a threshold number of main frame commits (e.g., a website having more than 10 main frame commits per second), this may indicate that website 105 is highly demanding of processing power, and thus is a power hungry website. In contrast, if the number of main frame commits is not above the threshold number of main frame commits, this may indicate that the website is not a power hungry website.

A webpage may contain one or more elements, and a number of these elements may change over time. While browser 120 is loading the webpage, browser 120 may show portions of the webpage to user 103 as it is being downloaded. Browser 120 may be programmed to render intermediate frames to enhance the user's experience and let the user know that browser 120 has not frozen and is still in the process of loading the webpage. The rendering of the intermediate frames may have a negative impact on battery life. As browser 120 continues to download the remaining portions of the webpage, the content that has already been downloaded and made ready for rendering may change. Accordingly, during a first life cycle of this webpage load, a large number of main frame commits may have occurred because the elements contained in or referenced by the webpage may be undergoing changes as more content of the webpage is downloaded. It may be desirable to avoid rendering at least one of the intermediate frames because the final frame of the displayed webpage may be different from the intermediate frames, thus saving processing power that would have been consumed for rendering the intermediate frame.

In some examples, the browser metrics include a number of compositing cycles triggered based on rendering one or more webpages of set of webpages 206A-D. The number of compositing cycles may correspond with the accessing of website 105 (e.g., loading of webpages 206A, 206B, 206C, and/or 206D) at mobile device 102. Multiple lifecycles of webpage 206 may be processed by the rendering thread in response to a main frame commit. In response to a determination that a threshold number of elements contained in or referenced by a webpage have been downloaded and have changed since the last commit, browser 120 may commit the content to the rendering thread for display on display 118. Browser 120 may decide to trigger a compositing cycle in response to the determination to commit the content to the rendering thread, but may also decide not to trigger a compositing cycle in response to the determination to commit the content to the rendering thread. The more compositing cycles that are triggered, the higher the likelihood of GPU 114 being used for rendering operations. If a number of triggered compositing cycles corresponding with accessing website 105 at mobile device 102 is above a threshold number of triggered compositing cycles (e.g., 30 compositing cycles per second when not driven by user scrolling), this may indicate that the website is highly demanding of processing power, and thus is a power hungry website. In contrast, if the number of triggered compositing cycles is not above the threshold number of triggered compositing cycles, this may indicate that the website is not a power hungry website.

In some examples, the browser metrics include an average time cost of compositing cycles based on rendering one or more webpages of set of webpages 206A-D. The average time cost of compositing cycles may correspond with the accessing of website 105 (e.g., loading of webpages 206A, 206B, 206C, and/or 206D) at mobile device 102. Some compositing cycles may be heavy, and some may be light. Depending on the type of layout of a webpage or the element that changes the most in the webpage (e.g., changes its position in the layout), a particular commit may be small (e.g., taking a few milliseconds) or large (e.g., taking 100 milliseconds or 10 seconds). For example, if a compositing cycle shades a whole webpage a particular color, this is a simple operation that may be done quickly even if multiple compositing cycles are shading the webpage with different colors. In this example, the compositing cycle is probably not a big drain on battery power. In contrast, if a compositing cycle includes a large number of animated elements that change their position on the display frequently, it may be computationally expensive to process this compositing cycle. In this example, the compositing cycle may be a big drain on battery power. Accordingly, it may be desirable for browser metrics module 124 to track how expensive each commit is. The time cost of a commit is the amount of time it takes for the transfer of data from the main thread to the rendering thread. During this time, browser 120 blocks both the main and rendering threads in order to transfer data between them. If an average time cost of compositing cycles corresponding with accessing website 105 at mobile device 102 is above a threshold average time cost of compositing cycles (e.g., approximately 33 milliseconds), this may indicate that the website is highly demanding of processing power, and thus is a power hungry website. In contrast, if the average time cost of compositing cycles is not above the threshold average time cost of compositing cycles, this may indicate that the website is not a power hungry website In some examples, the browser metrics include a number of rendered request animation frame (rAF) elements based on rendering one or more webpages of set of webpages 206A-D. The number of rendered rAF elements correspond with the accessing of website 105 (e.g., loading of webpages 206A, 206B, 206C, and/or 206D) at mobile device 102. A rAF element informs browser 120 that a particular element on the webpage will be animated and the animation should happen at the maximum compositing frame rate that browser 120 can achieve on the particular platform of mobile device 102. The maximum compositing frame rate may be the maximum refresh rate that the underlying platform can support. An example of the maximum compositing frame rate for mobile device 102 is 60 frames per second (fps). In this example, rAF elements animate at 60 fps on display 118 of mobile device 102. The frame rate is driven by the underlying hardware. Accordingly, other mobile devices may have different maximum compositing frame rates. In some examples, a mobile device may have a maximum compositing frame rate of 50 fps or 70 fps. If a number of rendered rAF elements corresponding with accessing website 105 at mobile device 102 is above a threshold number of rendered rAF elements, this may indicate that the website is highly demanding of processing power, and thus is a power hungry website. In contrast, if the number of rendered rAF elements is not above the threshold number of rendered rAF elements, this may indicate that the website is not a power hungry website.

In some examples, the browser metrics include a number of texture uploads generated based on rendering one or more webpages of set of webpages 206A-D. The number of texture uploads correspond with the accessing of website 105 (e.g., loading of webpages 206A, 206B, 206C, and/or 206D) at mobile device 102. Each browser that renders a webpage may split it up into smaller tiles different from other browsers. A browser may split up a webpage into tiles based on various factors such as the processing power of CPU 112 and/or GPU 114. The number of generated texture uploads is an indicator of the number of times data bandwidth is being sent from CPU 112 to GPU 114 which consumes power. If a number of generated texture uploads corresponding with accessing website 105 at mobile device 102 is above a threshold number of generated texture uploads (e.g., more than twice the number of textures needed to cover display 118), this may indicate that the website is highly demanding of processing power, and thus is a power hungry website. In contrast, if the number of generated texture uploads is not above the threshold number of generated texture uploads, this may indicate that the website is not a power hungry website.

In some examples, the browser metrics include at least one of an average time cost of main frame commits based on rendering one or more webpages of set of webpages 206A-D. The average time cost of main frame commits may correspond with the accessing of website 105 (e.g., loading of webpages 206A, 206B, 206C, and/or 206D) at mobile device 102. If an average time cost of main frame commits corresponding with accessing website 105 at mobile device 102 is above a threshold average time cost of main frame commits, this may indicate that the website is highly demanding of processing power, and thus is a power hungry website. In contrast, if the average time cost of main frame commits is not above the threshold average time cost of main frame commits, this may indicate that the website is not a power hungry website.

In some examples, the browser metrics include an average time cost of client-side invocations on one or more Web-worker threads based on rendering one or more webpages of set of webpages 206A-D. The average time cost of client-side invocations on one or more Web-worker threads may correspond with the accessing of website 105 (e.g., loading of webpages 206A, 206B, 206C, and/or 206D) at mobile device 102. Web-worker threads are a construct in the JAVA® programming language that are created separate from the main thread and used to perform expensive operations. Trademarks are the property of their respective owners. For example, if a webpage contains JavaScript code that is heavy and computationally expensive, a Web worker thread may be instantiated to process the JavaScript code. Accordingly, the mere presence of a Web-worker thread may indicate that the webpage contains computationally expensive code. If an average time cost of client-side invocations on one or more Web-worker threads corresponding with accessing website 105 at mobile device 102 is above a threshold average time cost of client-side invocations Web-worker threads (e.g., 100 milliseconds), this may indicate that the website is highly demanding of processing power, and thus is a power hungry website. In contrast, if the average time cost of client-side invocations on one or more Web-worker threads is not above the threshold average time cost of client-side invocations Web-worker threads, this may indicate that the website is not a power hungry website.

In some examples, the browser metrics include the network bandwidth required based on rendering one or more webpages of set of webpages 206A-D. The network bandwidth may correspond with the accessing of website 105 (e.g., loading of webpages 206A, 206B, 206C, and/or 206D) at mobile device 102. For example, network interface card 119 or browser 120 may measure the amount of bytes downloaded for loading webpages from website 105 at mobile device 102. The amount of bytes may be used as a proxy for the amount of time the modem or Wi-fi chip in mobile device 102 is working and its impact on battery power. If the network bandwidth corresponding with accessing website 105 at mobile device 102 is above a threshold network bandwidth, this may indicate that website 105 is highly demanding of processing power, and thus is a power hungry website. In contrast, if the network bandwidth is not above the threshold network bandwidth, this may indicate that the website is not a power hungry website.

In some examples, the browser metrics include a number of image bytes to be decoded based on rendering one or more webpages of set of webpages 206A-D. The number of image bytes to be decoded may correspond with the accessing of website 105 (e.g., loading of webpages 206A, 206B, 206C, and/or 206D) at mobile device 102. Image elements may be expensive to render, and browser metrics module 124 may keep track of the number of image elements or the number of image bytes corresponding with the accessing of website 105. If a number of image bytes to be decoded corresponding with accessing website 105 at mobile device 102 is above a threshold number of image bytes to be decoded, this may indicate that website 105 is highly demanding of processing power, and thus is a power hungry website. In contrast, if the number of image bytes to be decoded is not above the threshold number of image bytes to be decoded, this may indicate that the website is not a power hungry website.

In some examples, the browser metrics include a number of rendered video elements based on rendering one or more webpages of set of webpages 206A-D. The number of rendered video elements may correspond with the accessing of website 105 (e.g., loading of webpages 206A, 206B, 206C, and/or 206D) at mobile device 102. Video elements may be expensive to render, and browser metrics module 124 may keep track of the number of rendered video elements corresponding with accessing website 105. If a number of rendered video elements corresponding with accessing website 105 at mobile device 102 is above a threshold number of rendered video elements (e.g., more than two video elements playing concurrently on the same webpage), this may indicate that website 105 is highly demanding of processing power, and thus is a power hungry website. In contrast, if the number of rendered video elements is not above the threshold number of rendered video elements, this may indicate that the website is not a power hungry website.

In some examples, the browser metrics include a number of graphic layers created based on rendering one or more webpages of set of webpages 206A-D. The number of graphic layers created for rendering the webpage may correspond with the accessing of website 105 (e.g., loading of webpages 206A, 206B, 206C, and/or 206D) at mobile device 102. Browser 120 may create graphics layers in response to loading a webpage, which may contain or reference multiple elements. A particular sub-section of these elements included or referenced by the webpage may have its own layer. An advantage of creating multiple graphics layers for rendering a webpage may be that if one element changes, then only the layer containing that element and the corresponding elements around that changed element may be re-rendered. Accordingly, in this scenario, not all of the elements need to be re-rendered. The number of graphics layers created to render a webpage may indicate how expensive it was to change the content on the webpage. If a number of created graphic layers corresponding with accessing website 105 at mobile device 102 is above a threshold number of created graphic layers (e.g., more than five graphic layers), this may indicate that website 105 is highly demanding of processing power, and thus is a power hungry website. In contrast, if the number of created graphic layers is not above the threshold number of created graphic layers, this may indicate that the website is not a power hungry website.

In some examples, the browser metrics include an average time cost of rasterization based on rendering one or more webpages of set of webpages 206A-D. The average time cost of rasterization for rendering one or more webpages of set of webpages 206A-D may correspond with the accessing of website 105 (e.g., loading of webpages 206A, 206B, 206C, and/or 206D) at mobile device 102. The time cost of rasterization may refer to the amount of time for browser 120 to process hypertext markup language (HTML) commands in a webpage and convert them into pixels. A higher average time cost of rasterization may be used as a proxy to indicate that more processing power is used to convert HTML commands into pixels for display on display 118. If an average time cost of rasterization corresponding with accessing website 105 at mobile device 102 is above a threshold average time cost of rasterization, this may indicate that website 105 is highly demanding of processing power, and thus is a power hungry website. In an example, heavy rasterization may be four times the frame time (e.g., 66 milliseconds). In contrast, if the average time cost of rasterization is not above the threshold average time cost of rasterization, this may indicate that the website is not a power hungry website.

In some examples, the browser metrics include a number of rendered animating elements based on rendering one or more webpages of set of webpages 206A-D. The number of rendered animating elements may correspond with the accessing of website 105 (e.g., loading of webpages 206A, 206B, 206C, and/or 206D) at mobile device 102. An animated element may be, for example, a video, animated Graphics Interchange Format (GIF), a game running on mobile device 102, or a Flash element. Animating elements may be expensive to render, and browser metrics module 124 may keep track of the number of rendered animating elements corresponding with accessing website 105. If a number of rendered animating elements corresponding with accessing website 105 at mobile device 102 is above a threshold number of rendered animating elements, this may indicate that website 105 is highly demanding of processing power, and thus is a power hungry website. In contrast, if the number of rendered animating elements is not above the threshold number of rendered animating elements, this may indicate that the website is not a power hungry website.

Power consumption estimator 122 may receive browser metrics 130 from browser metrics module 124 and/or receive hardware metrics 140 from hardware monitor 126. Power consumption estimator 122 may estimate a power consumption by the mobile device while accessing the single website (e.g., website 105), where the estimated power consumption is based only on browser metrics 130, only on hardware metrics 140, or a combination of both browser metrics 130 and hardware metrics 140. Power consumption estimator 122 may update list of websites 220 accordingly. In response to a determination that website 105 is a power hungry application, power consumption estimator 122 may add website 105 to list of websites 220. In contrast, in response to a determination that website 105 is not a power hungry application, power consumption estimator 122 does not add website 105 to list of websites 220, or removes it from list of websites 220 if website 105 is included in the list.

Power consumption estimator 122 may calculate a score for one or more websites accessed by mobile device 102 and assign the score to the appropriate website. A website's score may indicate the "heaviness" of the website. If a score assigned to a website is above a threshold score, the website may be identified as a power hungry website. If the score assigned to a website is not above the threshold score, the website may be identified as not a power hungry website.

In some examples, power consumption estimator 122 assigns weights to each of the tracked metrics to determine a rating of the power impact of the website as well as an estimation of power consumption of that website on mobile device 102. The weights that are assigned may be determined by expert analysis or by applying learning techniques. A first weight may be assigned to number of rAF elements and a second weight may be assigned to the number of graphic layers created for the webpage. Expert analysis may indicate that the number of rAF elements in a webpage to be rendered has a bigger impact on power than the number of graphic layers created for the webpage. In this example, the first weight may be greater than the second weight.

C. Provide User with a Warning

Figure 4:
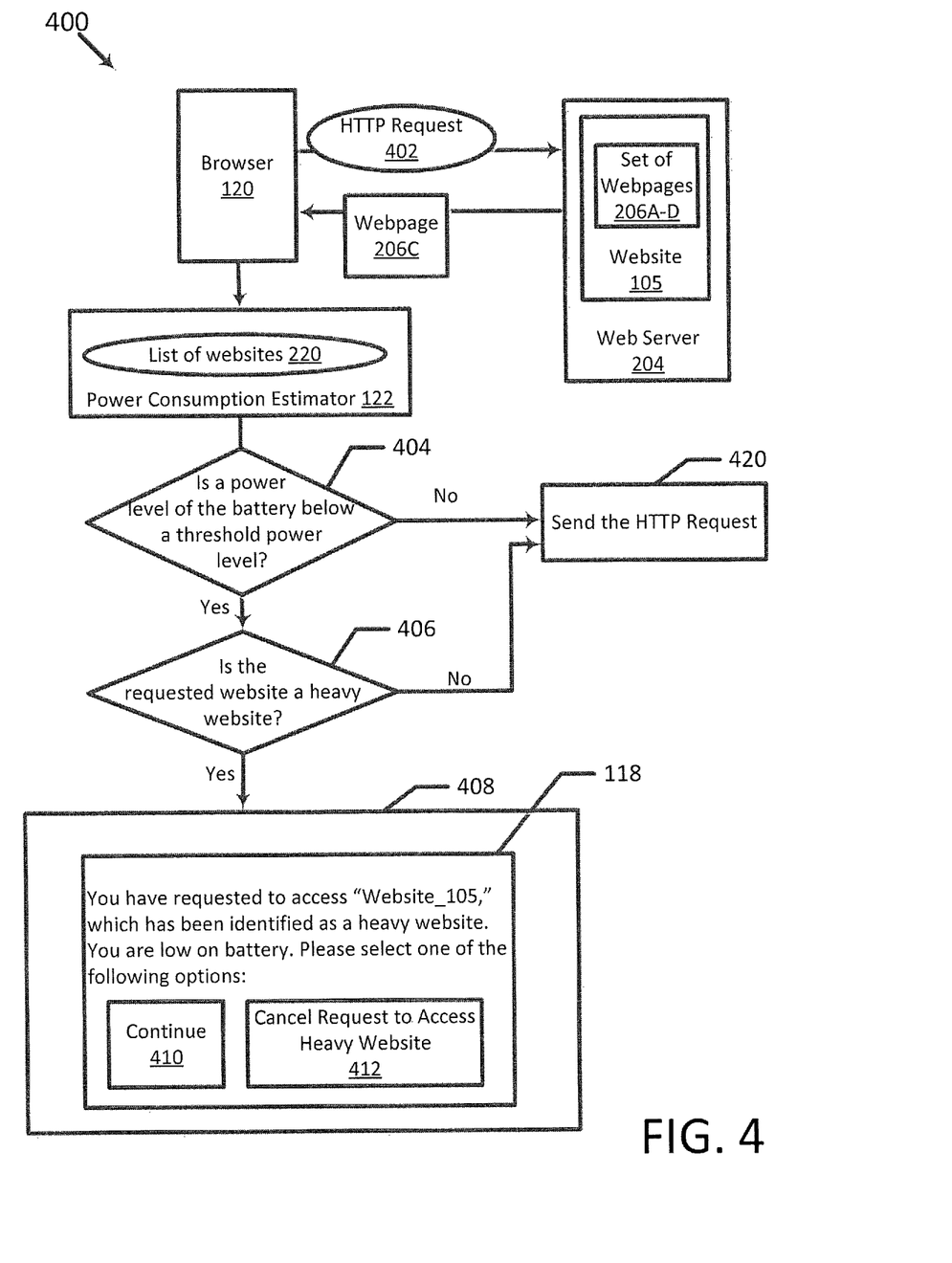
FIG. 4 is a process flow for providing a user of a mobile device with a warning that the power level of a battery that powers the mobile device is below a threshold level and the user is attempting to access a heavy application, in accordance with one or more embodiments.

If the power level of battery 116 is below a threshold power level and user 103 attempts to access an application listed in list of websites 220, mobile device 102 may provide a warning to user 103. FIG. 4 is a process flow 400 for providing the user with a warning that the power level of battery 116 is below a threshold power level and the user is attempting to access a heavy application, in accordance with one or more embodiments.

In FIG. 4, user 103 may attempt to point browser 120 at website 105. An HTTP request 402 may be a request for a webpage of the requested website. Before browser 120 sends HTTP request 402 to web server 204, power consumption estimator 122 may perform an action 404, in which power consumption estimator 122 determines whether a power level of battery 116 is below a threshold power level. At an action 406, in response to a determination that the power level of battery 116 is below the threshold power level, power consumption estimator 122 may determine whether the requested website is a heavy website. Power consumption estimator 122 may determine whether the requested website is a heavy website by determining whether the website is listed in list of websites 220. In response to a determination that the requested website is listed in list of websites 220, power consumption estimator 122 determines that the requested website is a heavy website.

At an action 408, in response to a determination that the requested website is a heavy website, power consumption estimator 122 may display a warning on display 118. In the example illustrated in FIG. 4, the warning displayed on display 118 states, "You have requested to access 'Website_105," which has been identified as a heavy website. You are low on battery. Please select one of the following options." Display 118 may also include a user selectable option "Continue" 410 and a user selectable option "Cancel Request to Access Heavy Website" 412. If user selectable option "Continue" 410 is selected by user 103, this selection confirms that the user knows she is accessing a heavy website despite mobile device 102 being low on battery. In response to the selection of user selectable option "Continue" 410, browser 120 may send HTTP request 402 to web server 204 and receive the requested webpage of website 105. If user selectable option "Cancel Request to Access Heavy Website" 412 is selected by user 103, this selection instructs browser 120 to not send HTTP request 402 to web server 204. In this example, browser 120 may discard the request to access website 105 because user 103 has opted to cancel her request to access this website.

At an action 420, in response to a determination that the power level of battery 116 is not below the threshold power level and/or a determination that the requested website is not a heavy website, browser 120 may send HTTP request 402 to web server 204. Responsive to HTTP request 402, web server 204 may provide the requested webpage to browser 120.

It is understood that actions 404, 406, 408, and 420 may be performed in a different sequence than described above. For example, action 406 may be performed before action 404. In this example, power consumption estimator 122 may first determine whether the requested website is a heavy website and if it is, determine whether a power level of the battery is below the threshold power level. Other variations are within the scope of the present disclosure. It is also understood that additional actions may be performed before, during, or after actions 404, 406, 408, and 420 discussed above. It is also understood that one or more of actions 404, 406, 408, and 420 may be omitted or combined. In an example, action 404 may be omitted. In this example, power consumption estimator 122 may provide user 103 with a warning if a requested website is heavy, regardless of whether the battery is below the threshold power level.

IV. Lifecycles of a Webpage

Using a combination of hardware metrics and browser, power consumption estimator 122 may estimate the impact on power during specific lifecycles of a webpage. If enough data is available for a particular webpage, the next time user 103 attempts to load the webpage, power consumption estimator 122 may display the website's power rating and average estimated power consumption per usage instance to the user.

Power consumption estimator 122 may track metrics (e.g., hardware metrics and/or browser metrics) during the various lifecycles of a webpage. The lifecycles of a webpage that may be tracked may include "page load," "user idle," "user scroll," and/or "user zoom," among others. "Page load" may refer to the loading of the page. "User idle" may refer to the user not interacting with the webpage for a threshold amount of time. "User scroll" may refer to the user scrolling the webpage up, down, left, and/or right. "User zoom" may refer to the user zooming into or away from the webpage.

In some examples, power consumption estimator 122 tracks one or more metrics for each point in a webpage's lifecycle on a per-website basis. Power consumption estimator 122 may track all browser metrics for each point in a webpage's lifecycle. Power consumption estimator 122 may assign weights to each of the tracked metrics to determine a rating of the power impact of the website as well as an estimation of power consumption of that website on mobile device 102. The weights that are assigned may be determined by expert analysis or by applying learning techniques. Additionally, power consumption estimator 122 may assign weights to each of the steps in the webpage's lifecycle. Expert analysis may indicate that the loading of the webpage has a bigger impact on power than the "user idle" stage of the webpage's lifecycle. Accordingly, power consumption estimator 122 may assign a greater weight to the "page load" stage than the "user idle" stage. Power consumption estimator 122 may also keep track of the user's interaction with websites. For example, if the user is idle for long time and does not interact with a website that is launched on mobile device 102, power consumption estimator 122 may increase the weight of the "user idle" stage. In another example, some websites are amenable to being zoomed in and out (e.g., geographical mapping applications) and the user may consistently use this zoom feature. In this example, power consumption estimator 122 may increase the weight of the "user zoom" stage because power consumption estimator 122 may recognize that the "user zoom" stage is used quite frequently by the user.

As discussed above and further emphasized here, FIGS. 1-4 are merely examples, which should not unduly limit the scope of the claims. Although mobile device 102 is illustrated as being a mobile device, other embodiments including devices that are not mobile are within the scope of the present disclosure. For device 102 may be a stationary computing device such as a desktop computer.

IV. Example Method

Figure 5:
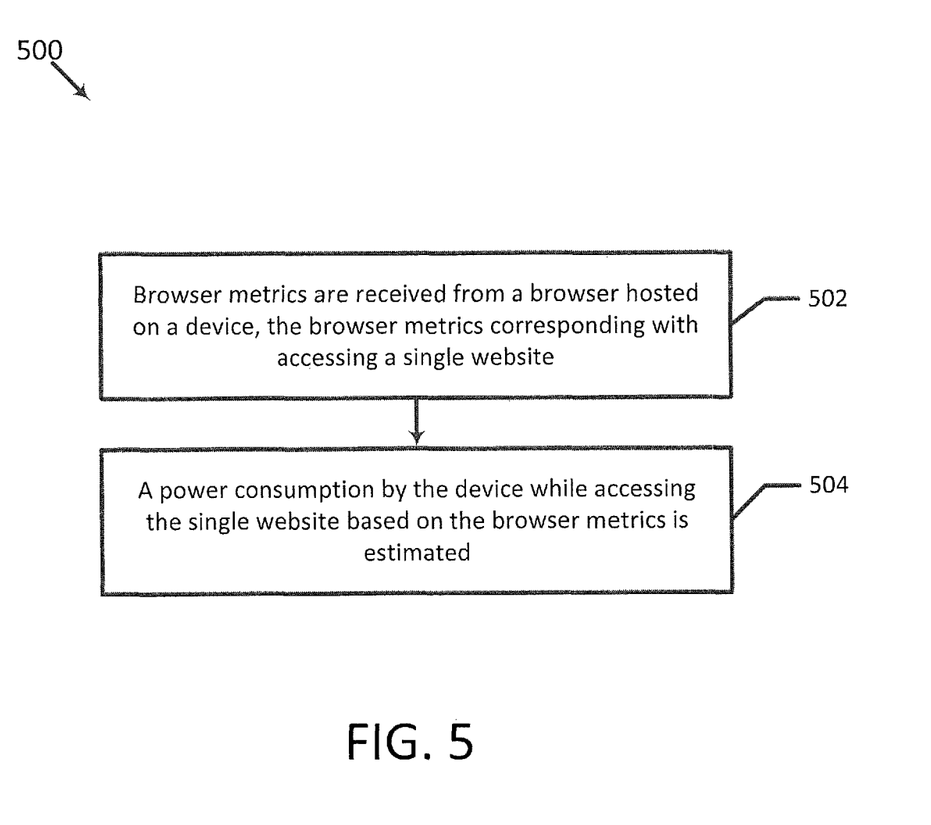
FIG. 5 is a simplified flowchart illustrating a method of estimating a power consumption of one or more websites in accordance with one or more embodiments.

FIG. 5 is a simplified flowchart illustrating a method 500 of estimating a power consumption of one or more websites in accordance with one or more embodiments. Method 500 is not meant to be limiting and may be used in other applications.

Method 500 includes blocks 502 and 504. In a block 502, browser metrics are received from a browser hosted on a device, the browser metrics corresponding with accessing a single website. In an example, power consumption estimator 122 receives browser metrics 130 from browser 120 hosted on mobile device 102, the browser metrics 130 corresponding with accessing website 105.

In a block 504, a power consumption by the device while accessing the single website based on the browser metrics is estimated. In an example, power consumption estimator 122 estimates a power consumption by mobile device 102 while accessing website 105 based on browser metrics 130.

In some embodiments, blocks 502 and 504 may be performed for any access to a website and the browser metrics updated on a per-website basis. It is also understood that additional processes may be performed before, during, or after blocks 502 and/or 504 discussed above. It is also understood that one or more of the blocks of method 500 described herein may be omitted, combined, or performed in a different sequence as desired.

For example, the browser metrics module may receive browser metrics 132 from browser 120, where browser metrics 132 is different from browser metrics 130 and correspond with accessing website 107, which is different from website 105. In this example, power consumption estimator 122 may estimate a second power consumption by mobile device 102 while accessing website 107 based on browser metrics 132. Power consumption estimator 122 may be able to estimate a power consumption of website 105 independent from website 107.

VI. Example Computing System

Figure 6:
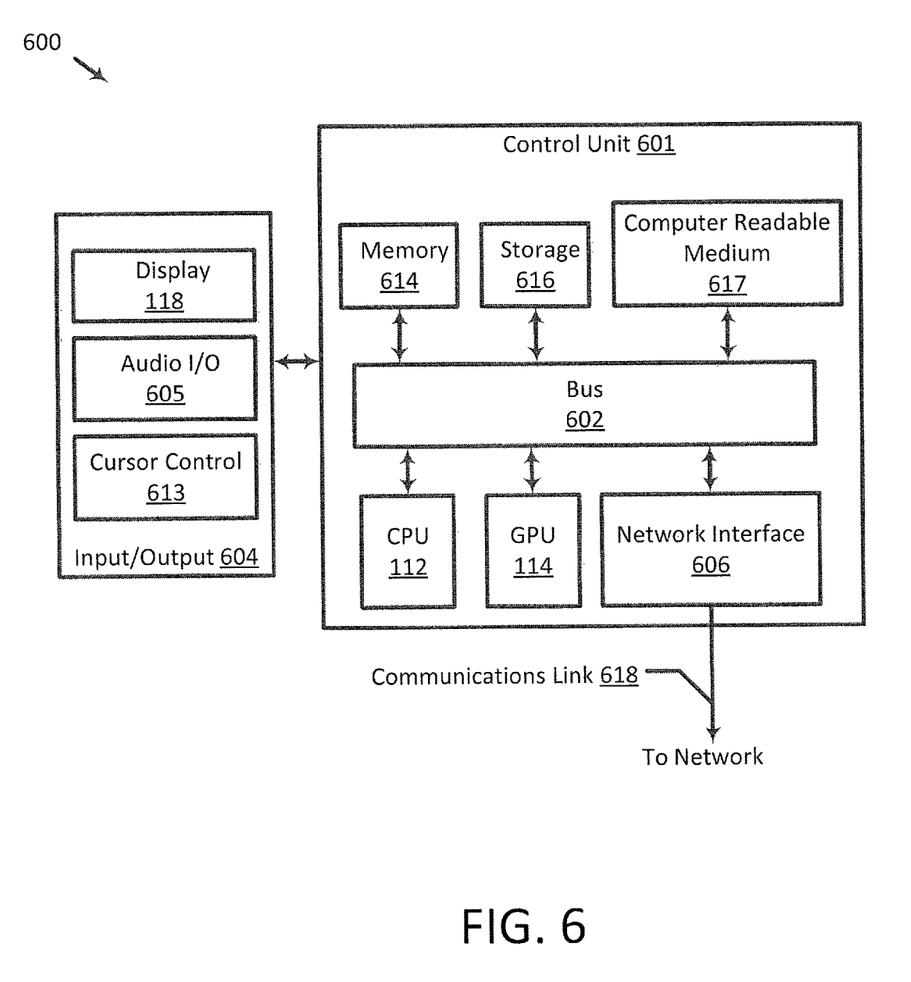
FIG. 6 is a block diagram of a computer system suitable for implementing one or more embodiments of the present disclosure.

FIG. 6 is a block diagram of an example computer system 600 suitable for implementing any of the embodiments disclosed herein. In various implementations, computer system 600 may be mobile device 102. Computer system 600 may include one or more processors. Computer system 600 may additionally include one or more storage devices each selected from a group including hard disk, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to computer system 600 using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 for processing user actions, such as selecting keys from a keypad/keyboard or selecting one or more buttons or links, etc., and sends a corresponding signal to bus 602. I/O component 604 may also include an output component such as a display 118, and an input control such as a cursor control 613 (such as a keyboard, keypad, mouse, etc.). User 103 may use cursor control 613 to point browser 120 to a website and retrieve webpages that are displayed on display 118.

An audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via a communications link 618 to a network. In an embodiment, the transmission is wireless, although other transmission mediums and methods may also be suitable. CPU 112, which may be a micro-controller, digital signal processor (DSP), or other processing component, processes these various signals, such as for display on display 118 of computer system 600 or transmission to other devices via communications link 618. Browser 120 may execute on CPU 112. CPU 112 may also control transmission of information, such as cookies or IP addresses, to other devices.

Computer system 600 includes GPU 114. CPU 112 may send a stream of commands to GPU 114 via bus 602. Although bus 602 is illustrated as being the path that delivers data between CPU 112 and GPU 114, this is not intended to be limiting and other embodiments using a different mechanism to deliver data between CPU 112 and GPU 114 are within the scope of the disclosure.

Components of computer system 600 also include a system memory component 614 (e.g., RAM), a static storage component 616 (e.g., ROM), and/or a computer readable medium 617. Computer system 600 performs specific operations by CPU 112 and other components by executing one or more sequences of instructions contained in system memory component 614. Logic may be encoded in computer readable medium 617, which may refer to any medium that participates in providing instructions to CPU 112 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 614, and transmission media include coaxial cables, copper wire, and fiber optics, including wires that include bus 602. In an embodiment, the logic is encoded in non-transitory computer readable medium. Computer readable medium 617 may be any apparatus that can contain, store, communicate, propagate, or transport instructions that are used by or in connection with CPU 112. Computer readable medium 617 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences to practice the present disclosure may be performed by computer system 600. In various other embodiments of the present disclosure, a plurality of computer systems 600 coupled by communications link 618 to the network (e.g., such as a LAN, WLAN, PTSN, and/or various other wired or wireless networks, including telecommunications, mobile, and cellular phone networks) may perform instruction sequences (e.g., method 500) to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions or blocks described herein may be changed, combined into composite actions or blocks, and/or separated into sub-actions or blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of estimating a power consumption of one or more websites, comprising:
   receiving first browser metrics from a browser hosted on a device, the first browser metrics corresponding with accessing a first webpage of a website;
   estimating a power consumption by the device while accessing the first webpage based on the first browser metrics;
   receiving second browser metrics from the browser, the second browser metrics corresponding with accessing a second webpage of the website;
   updating the power consumption in accordance with the second browser metrics;
   adding, based on the updated power consumption, an identifier of the website to a list of websites that have been identified as power hungry websites;
   detecting a request by a user of the device to access a requested webpage of the website; and
   in response to detecting the request:
      providing a message on a display of the device indicating that the website is a power hungry website, the message including a first user selectable option that if selected indicates that the user wishes to proceed with accessing the website and further including a second user selectable option that if selected indicates that the user does not wish to proceed with accessing the website;
      in response to receiving a selection of the first user selectable option, rendering the requested webpage on a display of the device; and
      in response to receiving a selection of the second user selectable option, sending an instruction to the browser to disregard the request to access the requested webpage.

2. The method of claim 1, further comprising:
   receiving hardware metrics from a hardware monitor, the hardware metrics corresponding with accessing one or more of the plurality of webpages, wherein estimating the power consumption is further based on the hardware metrics.

3. The method of claim 2, wherein the hardware metrics include at least one of a process time of one or more CPUs, a CPU frequency of the one or more CPUs, GPU process time of one or more GPUs, statistics of a battery, and an amount of data downloaded to render a webpage corresponding with the accessing of the single website.

4. The method of claim 1, wherein the browser metrics include a number of client-side invocations on one or more rendered frames based on rendering one or more webpages of the plurality of webpages, the number of client-side invocations corresponding with the accessing of the one or more webpages of the plurality.

5. The method of claim 4, wherein the client-side invocations are JavaScript invocations.

6. The method of claim 1, wherein the browser metrics include an average time cost of one or more client-side invocations on one or more rendered frames based on rendering one or more webpages of the plurality of webpages, the average time cost corresponding with the accessing of the one or more webpages of the plurality.

7. The method of claim 1, wherein the browser metrics include a number of main frame commits based on rendering one or more webpages of the plurality of webpages, the number of main frame commits corresponding with the accessing of the one or more webpages of the plurality.

8. The method of claim 1, wherein the browser metrics include a number of compositing cycles triggered based on rendering one or more webpages of the plurality of webpages, the number of compositing cycles corresponding with the accessing of the one or more webpages of the plurality.

9. The method of claim 1, wherein the browser metrics include an average time cost of compositing cycles based on rendering one or more webpages of the plurality of webpages, the average time cost of compositing cycles corresponding with the accessing of the one or more webpages of the plurality.

10. The method of claim 1, wherein the browser metrics include a number of rendered request animation frame (rAF) elements based on rendering one or more webpages of the plurality of webpages, the number of rAF elements corresponding with the accessing of the one or more webpages of the plurality.

11. The method of claim 1, wherein the browser metrics include a number of texture uploads generated based on rendering one or more webpages of the plurality of webpages, the number of texture uploads corresponding with the accessing of the one or more webpages of the plurality.

12. The method of claim 1, wherein the browser metrics include at least one of an average time cost of main frame commits based on rendering one or more webpages of the plurality of webpages, an average time cost of client-side invocations on one or more Web-worker threads based on rendering one or more webpages of the plurality, network bandwidth required based on rendering one or more webpages of the plurality, a number of image bytes to be decoded based on rendering one or more webpages of the plurality, a number of rendered video elements based on rendering one or more webpages of the plurality, a number of graphic layers created based on rendering one or more webpages of the plurality, an average time cost of rasterization based on rendering one or more webpages of the plurality, and a number of rendered animating elements based on rendering one or more webpages of the plurality.

13. The system of claim 1, wherein the operations further comprise:
maintaining the list of websites that have been identified as power hungry websites, wherein the estimated power consumption is less than a threshold and the updated power consumption is not less than the threshold.

14. The method of claim 13, further comprising:
removing the identifier of the website from the list of websites if a second updated power consumption associated with the website is less than the threshold.

15. A system for estimating a power consumption of one or more websites, comprising:
a non-transitory memory; and
one or more hardware processors coupled to the non-transitory memory and configured to read instructions from the non-transitory memory to cause the system to perform operations comprising:
receiving first browser metrics from a browser hosted on a device, wherein the first browser metrics correspond with accessing a first webpage of a website;
estimating a power consumption by the device while accessing the first webpage based on the first browser metrics;
receiving second browser metrics from the browser, wherein the second browser metrics correspond with accessing a second webpage of the website;
updating the power consumption in accordance with the second browser metrics;
adding, based on the updated power consumption, an identifier of the website to a list of websites that have been identified as power hungry websites;
detecting a request by a user of the device to access a requested webpage of the website; and
in response to detecting the request:
providing a message on a display of the device indicating that the website is a power hungry website, the message including a first user selectable option that if selected indicates that the user wishes to proceed with accessing the website and further including a second user selectable option that if selected indicates that the user does not wish to proceed with accessing the website;
in response to receiving a selection of the first user selectable option, rendering the requested webpage on a display of the device; and
in response to receiving a selection of the second user selectable option, sending an instruction to the browser to disregard the request to access the requested webpage.

16. The system of claim 15, wherein the operations further comprise:
monitoring a hardware monitor that monitors hardware metrics of hardware coupled to the device, wherein the hardware metrics correspond with the accessing one or more of the plurality of webpages of the single web site, and wherein the estimating includes estimating the power consumption based on the hardware metrics.

17. The system of claim 15, wherein the device is a mobile device.

18. The system of claim 15, wherein the browser metrics include a number of client-side invocations on one or more rendered frames based on rendering one or more webpages of the plurality of webpages, the number of client-side invocations corresponding with the accessing of the one or more webpages of the plurality.

19. The system of claim 15, wherein the browser metrics include a number of main frame commits based on rendering one or more webpages of the plurality of webpages, the number of main frame commits corresponding with the accessing of the one or more webpages of the plurality.

20. The system of claim 15, wherein the browser metrics include a number of compositing cycles triggered based on rendering one or more webpages of the plurality, the number of compositing cycles corresponding with the accessing of the one or more webpages of the plurality.

* * * * *